US011264713B2

United States Patent
Chien et al.

(10) Patent No.: US 11,264,713 B2
(45) Date of Patent: Mar. 1, 2022

(54) ADJUSTABLE WIRELESS ACCESSIBLE POINT

(71) Applicant: Moxa Inc., New Taipei (TW)

(72) Inventors: Chih-Hou Chien, New Taipei (TW); Chih-Hao Chen, New Taipei (TW)

(73) Assignee: Moxa Inc., New Taipei (TW)

( * ) Notice: Subject to any disclaimer, the term of this patent is extended or adjusted under 35 U.S.C. 154(b) by 84 days.

(21) Appl. No.: 16/879,726

(22) Filed: May 20, 2020

(65) Prior Publication Data

US 2021/0226332 A1 Jul. 22, 2021

(30) Foreign Application Priority Data

Jan. 16, 2020 (TW) ................................. 109101474

(51) Int. Cl.
*H01Q 1/12* (2006.01)
*H01Q 3/08* (2006.01)
*H04W 88/08* (2009.01)

(52) U.S. Cl.
CPC .............. *H01Q 3/08* (2013.01); *H04W 88/08* (2013.01)

(58) Field of Classification Search
CPC ........ H01Q 1/246; H01Q 21/24; H01Q 21/26; H01Q 25/002; H01Q 21/061; H01Q 3/32; H01Q 9/42; H01Q 21/0025; H01Q 3/08; H01Q 3/02; H01Q 1/34; H01Q 1/22
USPC .......................... 343/575, 793, 795, 799, 810
See application file for complete search history.

(56) References Cited

U.S. PATENT DOCUMENTS

| | | | | |
|---|---|---|---|---|
| 5,517,205 A | * | 5/1996 | van Heyningen | H01Q 1/18 248/183.1 |
| 5,570,546 A | * | 11/1996 | Butterworth | E04H 12/34 343/890 |
| 5,929,820 A | * | 7/1999 | Caulfield | H01Q 19/108 343/761 |
| 6,448,940 B1 | * | 9/2002 | Chiang | H01Q 1/084 244/165 |
| 6,480,157 B1 | * | 11/2002 | Palmer | H01Q 1/08 343/700 MS |
| 6,501,351 B1 | * | 12/2002 | Gasnier | H01Q 1/04 333/256 |
| 8,786,511 B1 | * | 7/2014 | Dao | H01Q 21/26 343/803 |
| 2003/0201940 A1 | * | 10/2003 | Chiang | H01Q 1/241 343/700 MS |
| 2005/0237256 A1 | * | 10/2005 | Regala | H01Q 21/30 343/810 |
| 2013/0082158 A1 | * | 4/2013 | Sato | H01Q 1/3275 248/534 |

(Continued)

FOREIGN PATENT DOCUMENTS

CN  103050789 A  4/2013
CN  103606739 B  9/2015

*Primary Examiner* — Linh V Nguyen
(74) *Attorney, Agent, or Firm* — Winston Hsu

(57) ABSTRACT

An adjustable wireless accessible point includes a base, a plurality of antenna modules and an antenna driving module. The plurality of antenna modules are movably disposed on the base and for emitting or receiving wireless signals. The antenna driving module is movably connected to the plurality of antenna modules and for driving the plurality of antenna modules to synchronously move relative to the base, so as to achieve a purpose of adjusting a radiation pattern of the adjustable wireless accessible point.

11 Claims, 21 Drawing Sheets

(56) References Cited

U.S. PATENT DOCUMENTS

2017/0288294 A1* 10/2017 Kang ................. H01Q 1/34
2019/0198968 A1* 6/2019 Gerneth ............ H01Q 1/1214

* cited by examiner

ADJUSTABLE WIRELESS ACCESSIBLE POINT

BACKGROUND OF THE INVENTION

1. Field of the Invention

The present invention relates to a wireless accessible point, and more particularly, to an adjustable wireless accessible point with a function of radiation pattern adjustment.

2. Description of the Prior Art

With rapid development of wireless communication technology, automated logistics systems have been widely used in different fields. When it is desired to introduce an automated logistics system into a factory that occupies a large area and has a complicated environment, it is an important topic to establish a reliable wireless communication to ensure the automated logistics system to perform material distribution successfully. A conventional wireless accessible point usually includes a plurality of antennas with different radiation patterns, so that the conventional wireless accessible point can adjust an overall radiation pattern thereof by switching on/off the specific one or more antennas. However, the conventional wireless accessible point only has limited kinds of radiation patterns by such configuration, which cannot satisfy various needs of different fields.

SUMMARY OF THE INVENTION

Therefore, it is an objective of the present invention to provide an adjustable wireless accessible point with a function of radiation pattern adjustment for solving the aforementioned problem.

In order to achieve the aforementioned objective, the present invention discloses an adjustable wireless accessible point. The adjustable wireless accessible point includes a base, a plurality of antenna modules and an antenna driving module. The plurality of antenna modules are movably disposed on the base and for emitting or receiving wireless signals. The antenna driving module is movably connected to the plurality of antenna modules and for driving the plurality of antenna modules to synchronously move relative to the base.

According to an embodiment of the present invention, each of the plurality of antenna modules includes an antenna body and a mounting component. The mounting component is movably disposed on the base, and the antenna body is disposed on the mounting component.

According to an embodiment of the present invention, the mounting component is movably disposed on the base in a rotatable manner, a slidable manner or a combination thereof, and the antenna body is fixed on or detachably installed on the mounting component.

According to an embodiment of the present invention, the adjustable wireless accessible point further includes a seat and an inclining driving module. The base is movably disposed on the seat, and the inclining driving module drives the base to rotate relative to the seat around an inclining rotating axis perpendicular to a normal direction of the seat to adjust an inclined angle of the base relative to the seat.

According to an embodiment of the present invention, the adjustable wireless accessible point further includes a rotating driving module. The rotating driving module drives the base to rotate relative to the seat around an orientation rotating axis parallel to the normal direction of the seat to adjust an orientation of the base relative to the seat.

According to an embodiment of the present invention, the adjustable wireless accessible point further includes a seat and a rotating driving module. The base is movably disposed on the seat, and the rotating driving module drives the base to rotate relative to the seat around an orientation rotating axis parallel to a normal direction of the seat to adjust an orientation of the base relative to the seat.

According to an embodiment of the present invention, the plurality of antenna modules are disposed in a opposite or a circular arrangement. The antenna driving module is located between the plurality of antenna modules or within an area enclosed by the plurality of antenna modules.

According to an embodiment of the present invention, the antenna driving module includes a driving assembly and a linking assembly. The linking assembly is movably connected to the driving assembly and the plurality of antenna modules, and the driving assembly drives the plurality of antenna modules to synchronously move relative to the base by the linking assembly.

According to an embodiment of the present invention, the linking assembly includes a screw rod and at least one linking component. The at least one linking component is movably disposed on the screw rod and movably connected to the plurality of antenna modules. The driving assembly drives the screw rod to rotate so as to drive the at least one linking component to move along a longitudinal direction of the screw rod to drive the plurality of antenna modules to synchronously move relative to the base.

According to an embodiment of the present invention, the plurality of antenna modules are rotatably disposed on the base. The screw rod drives the at least one linking component to move along the longitudinal direction of the screw rod to drive the plurality of antenna modules to synchronously rotate relative to the base, so that the plurality of antenna modules are inclined relative to the base.

According to an embodiment of the present invention, when the screw rod drives the at least one linking component to move along the longitudinal direction of the screw rod, the at least one linking component drives the plurality of antenna modules to synchronously rotate relative to the base, so that the plurality of antenna modules are inclined relative to the base with equal inclined angles or different inclined angles.

In summary, the present invention utilizes the antenna driving module to drive each antenna module to move synchronously relative to the base to adjust a position of each antenna module relative to the base. Besides, the present invention further utilizes the inclining driving module to drive the base to rotate relative to the seat around the inclining rotating axis to adjust the inclined angle of the base relative to the seat. In addition, the present invention further utilizes the rotating driving module to drive the base to rotate relative to the seat about the orientation rotating axis to adjust the orientation of the base relative to the seat. In such a way, an overall radiation pattern of the adjustable wireless accessible point can be adjusted by adjusting the inclined angle of the base relative to the seat, the orientation of the base relative to the seat, the position of each antenna module relative to the base, or a combination thereof, to satisfy various needs of different fields. Therefore, the adjustable wireless accessible point of the present invention has an enhanced diversity of the radiation pattern and brings convenience in use.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
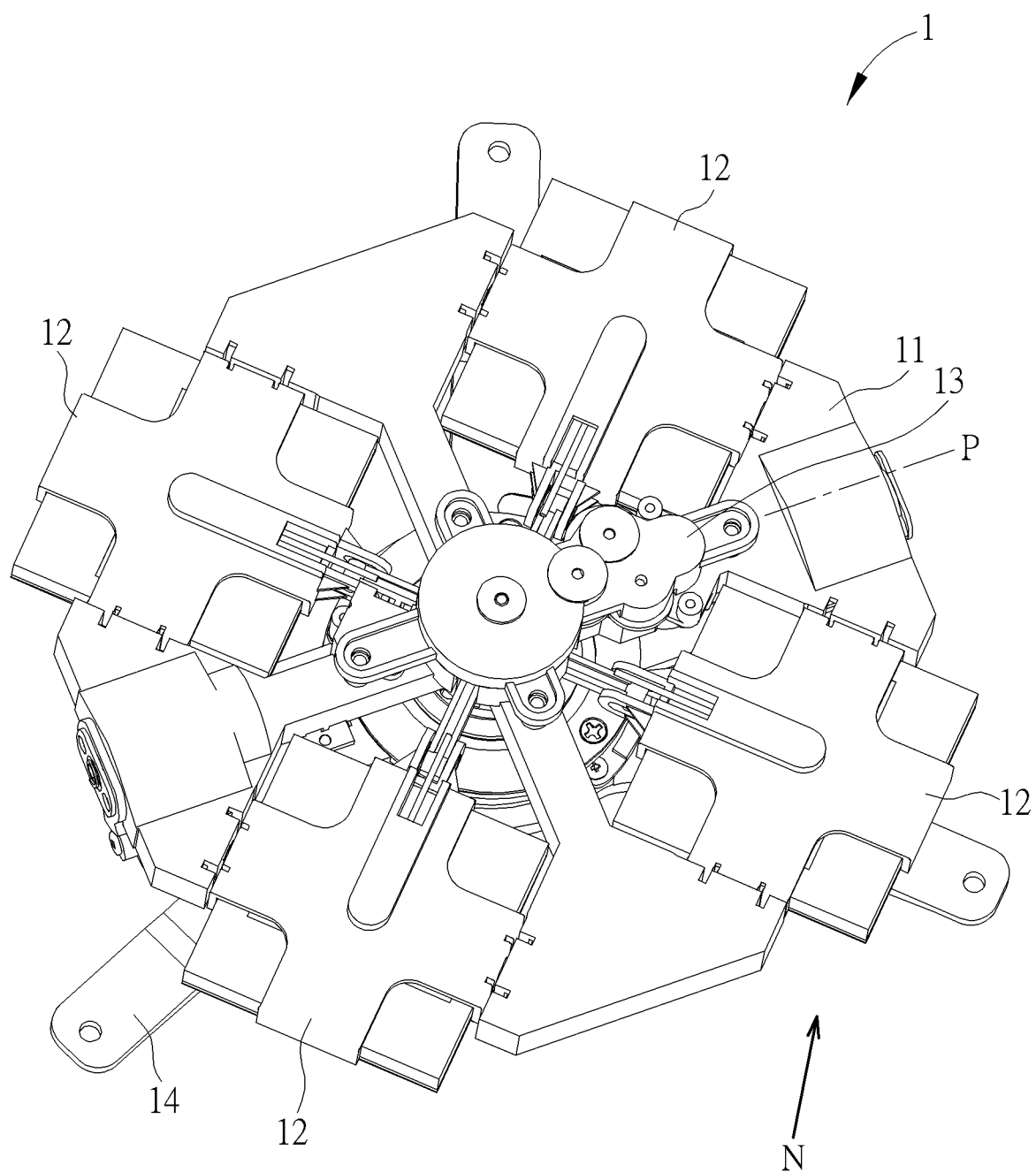
FIG. 1 and FIG. 2 are schematic diagrams of an adjustable wireless accessible point at different views according to a first embodiment of the present invention.
Figure 2:
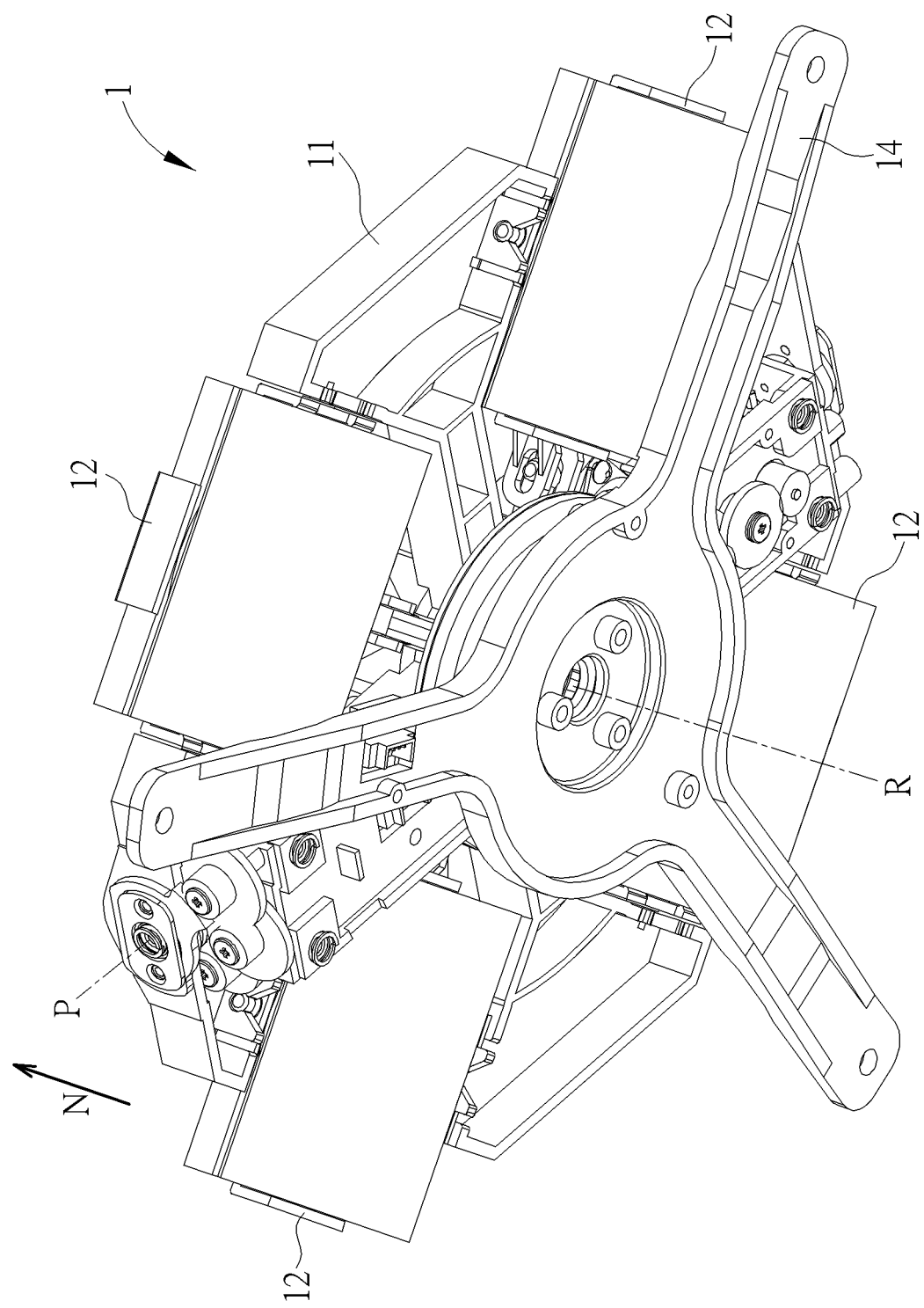
Figure 3:
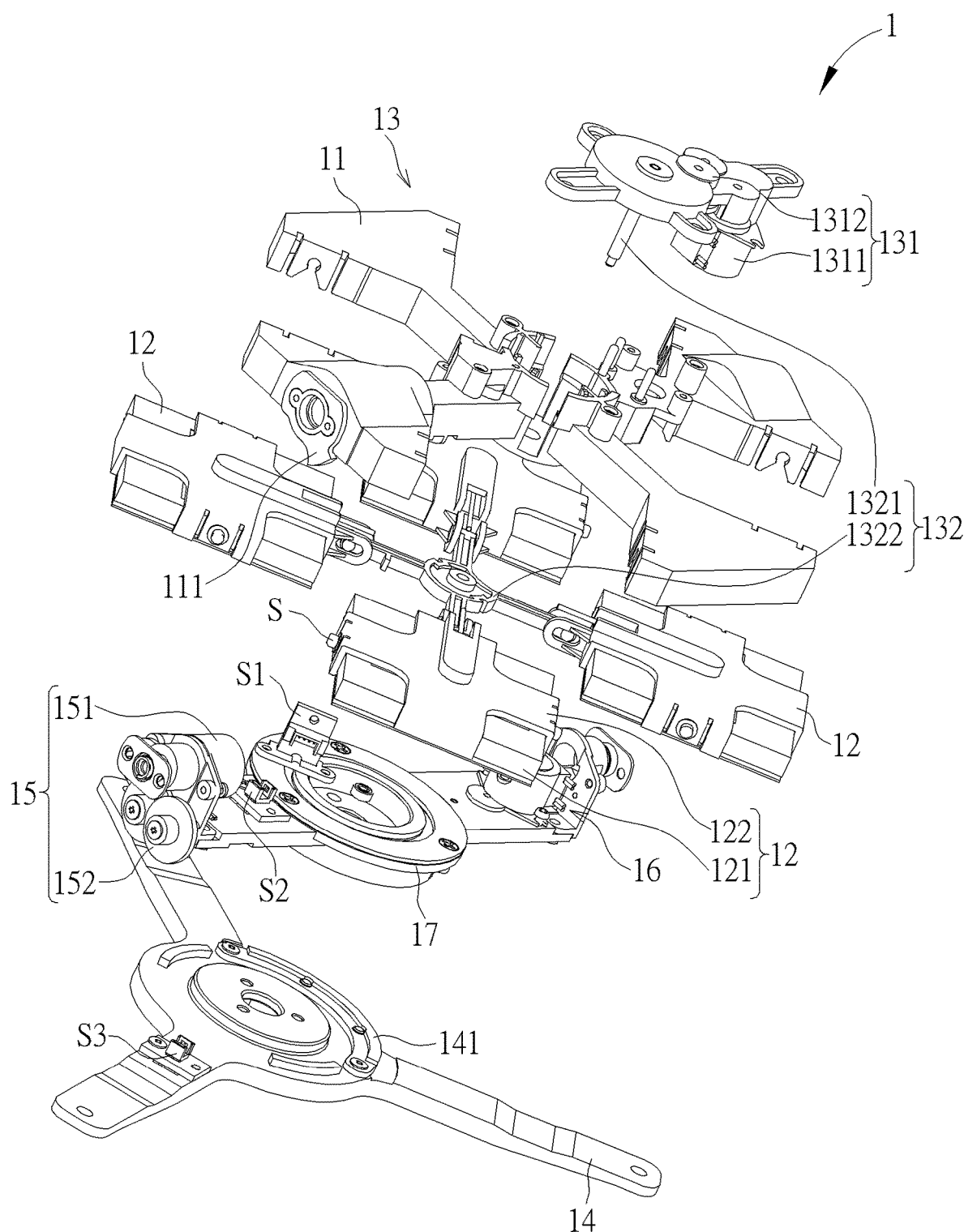
FIG. 3 and FIG. 4 are exploded diagrams of the adjustable wireless accessible point at different views according to the first embodiment of the present invention.
Figure 4:
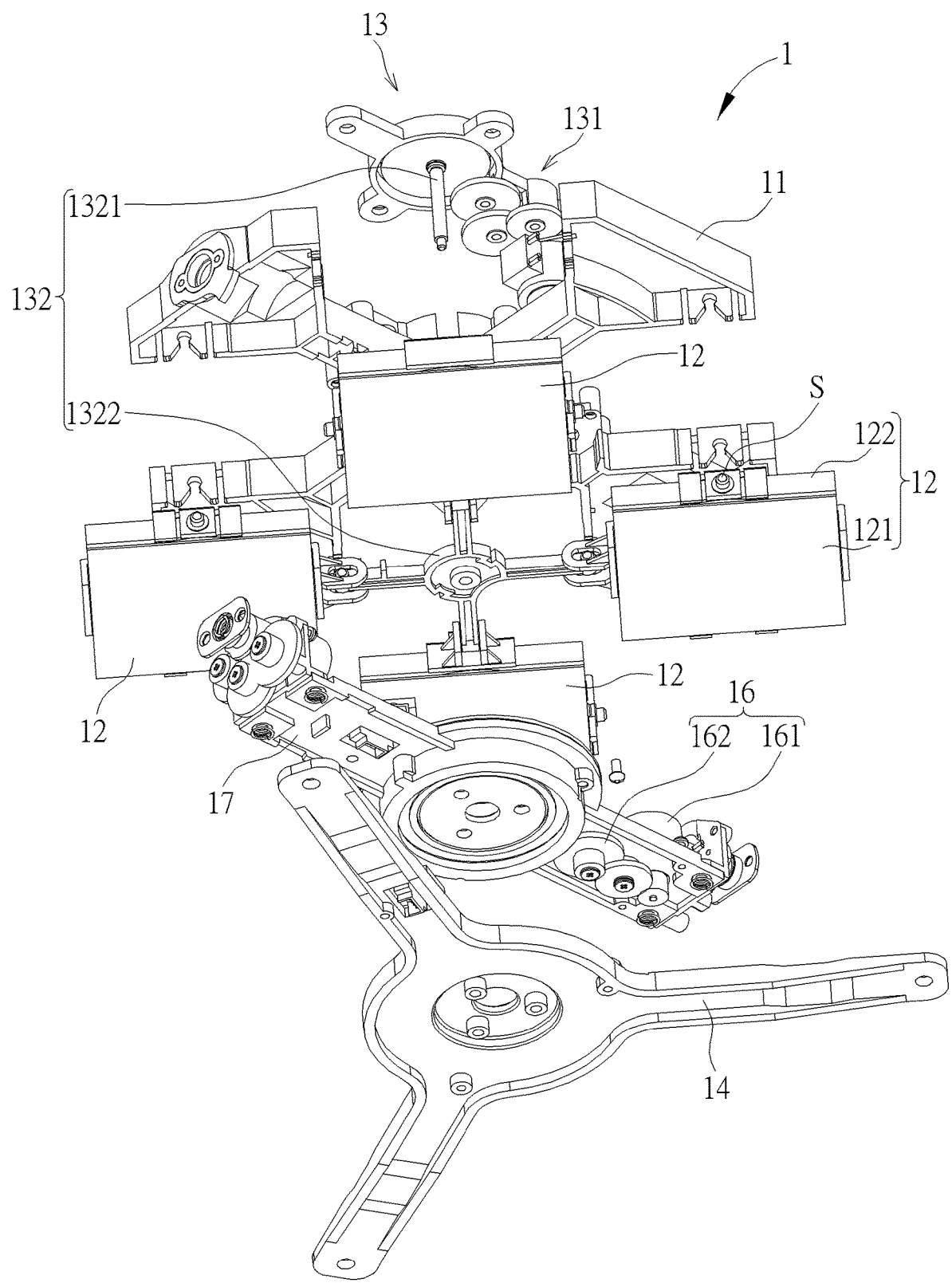

Please refer to FIG. 1 to FIG. 4. FIG. 1 and FIG. 2 are schematic diagrams of an adjustable wireless accessible point 1 at different views according to a first embodiment of the present invention. FIG. 3 and FIG. 4 are exploded diagrams of the adjustable wireless accessible point 1 at different views according to the first embodiment of the present invention. As shown in FIG. 1 to FIG. 4, the adjustable wireless accessible point 1 includes a base 11, four antenna modules 12, an antenna driving module 13, a seat 14, a inclining driving module 15 and a rotating driving module 16. The four antenna modules 12 are movably disposed on the base 11 and for emitting or receiving wireless signals. The antenna driving module 13 is movably connected to the four antenna modules 12 and for driving the four antenna modules 12 to synchronously move relative to the base 11 for adjusting a position of each antenna module 12 relative to the base 11. The base 11 is movably disposed on the seat 14. The inclining driving module 15 is for driving the base 11 to rotate relative to the seat 14 around an inclining rotating axis P perpendicular to a normal direction N of the seat 14 to adjust an inclined angle of the base 11 relative to the seat 14. The rotating driving module 16 is for driving the base 11 to rotate relative to the seat 14 around an orientation rotating axis R parallel to the normal direction N of the seat 14 to adjust an orientation of the base 11 relative to the seat 14. In other words, an overall radiation pattern of the adjustable wireless accessible point 1 can be adjusted by adjusting the inclined angle of the base 11 relative to the seat 14, the orientation of the base 11 relative to the seat 14 and/or the position of each antenna module 12 relative to the base 11.

Figure 5:
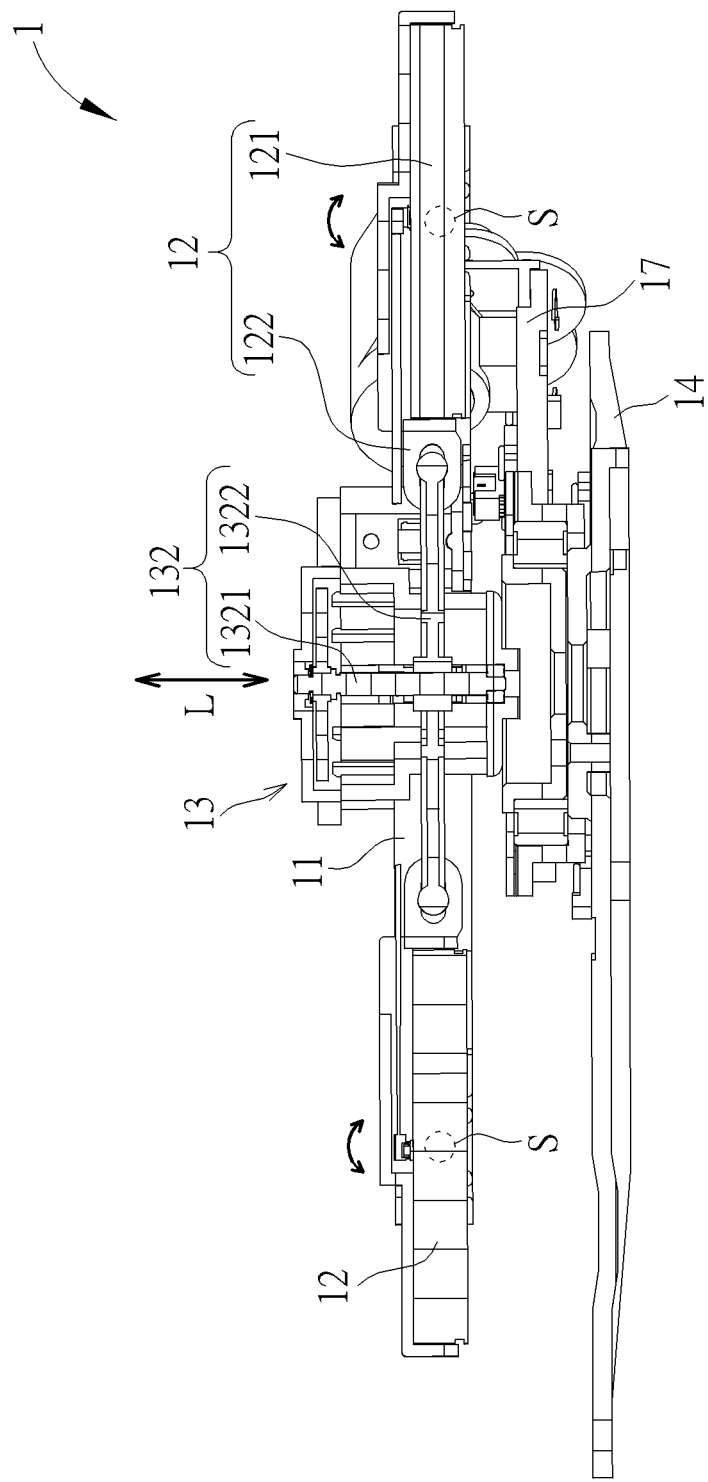
FIG. 5 and FIG. 6 are partial sectional diagrams of the adjustable wireless accessible point in different states according to the first embodiment of the present invention.
Figure 6:
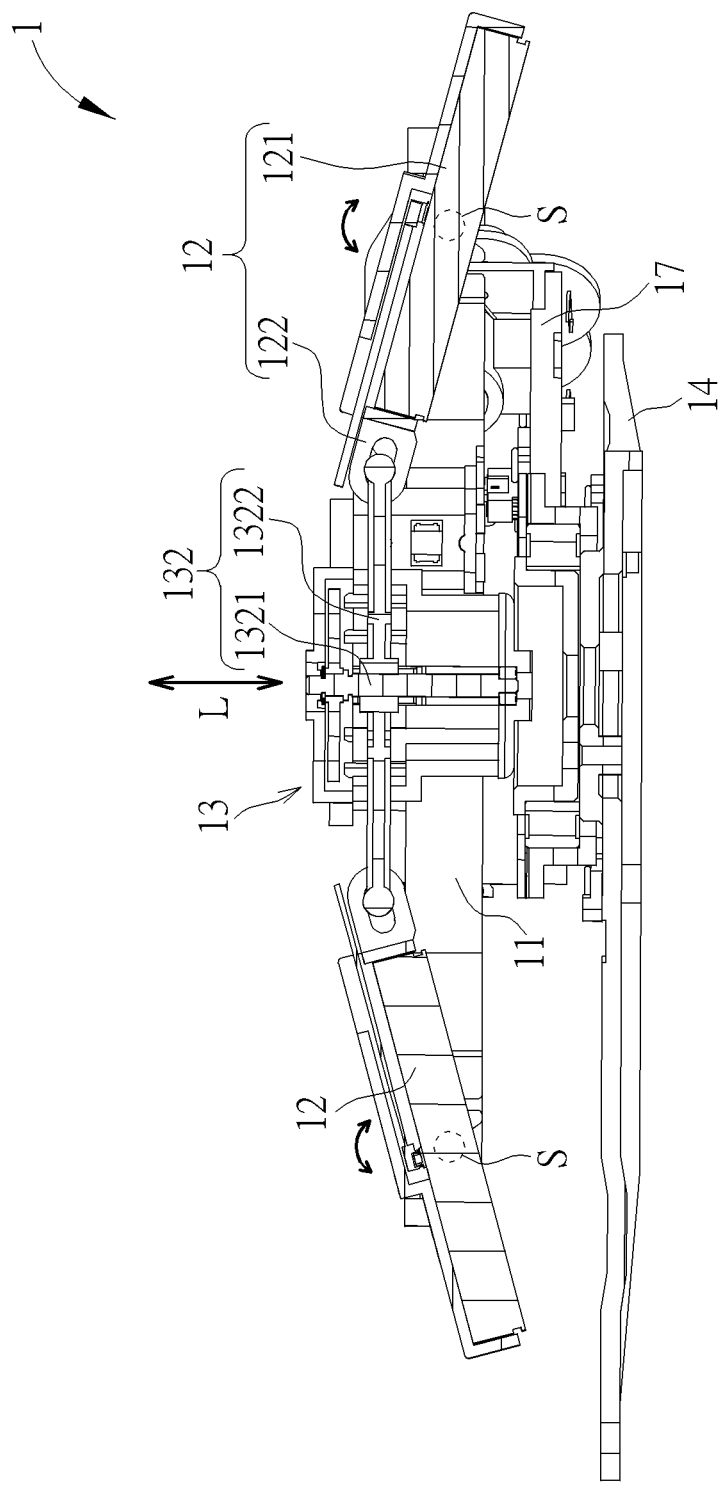

Specifically, please refer to FIG. 1 to FIG. 6. FIG. 5 and FIG. 6 are partial sectional diagrams of the adjustable wireless accessible point 1 in different states according to the first embodiment of the present invention. As shown in FIG. 1 to FIG. 6, the four antenna modules 12 can be arranged in a circular arrangement. Each antenna module 12 can be rotatably disposed on the base 11. The antenna driving module 13 can be configured to be located within an area enclosed by the four antenna modules 12. Furthermore, in this embodiment, each antenna module 12 includes an antenna body 121 and a mounting component 122. The mounting component 122 is rotatably disposed on the base 11. In order to achieve rotary movement of the mounting component 122 relative to the base 11, a pivoting shaft structure S can protrude from each mounting component 122 for rotatably cooperating with the base 11. Each antenna body 121 is installed on the corresponding mounting component 122 and rotatable relative to the base 11 around the corresponding pivoting shaft structure S along with rotation of the corresponding mounting component 122. The antenna driving module 13 includes a driving assembly 131 and a linking assembly 132. The linking assembly 132 includes a screw rod 1321 and a linking component 1322. The linking component 1322 is movably disposed on the screw rod 1321 and movably connected to the four antenna modules 12. The driving assembly 131 is for driving the screw rod 1321 to rotate to drive the linking component 1322 to move along a longitudinal direction L of the screw rod 1321 to move close to or away from the seat 14, so as to drive the four antenna modules 12 to synchronously rotate relative to the base 11 around the corresponding pivoting shaft structures S in a clockwise or counter clockwise direction for synchronously adjusting positions of the four antenna modules 12 relative to the base 11. In such a way, the four antenna bodies 121 can be inclined relative to the base 11 with equal inclined angles for adjusting the overall radiation pattern of the adjustable wireless accessible point 1.

Preferably, in this embodiment, the four antenna bodies 121 can be antenna components with same individual radiation patterns, and each antenna body 121 can be detachably installed on the corresponding mounting component 122. However, the present invention is not limited to this embodiment. It depends on practical demands. For example, in another embodiment, the antenna bodies of the four antenna modules also can be antenna components with different individual radiation patterns and fixed on the corresponding mounting components.

Besides, in this embodiment, the driving assembly 131 can include a first driving motor 1311 and a first transmission assembly 1312. The first driving motor 1311 is coupled to the screw rod 1321 by the first transmission assembly 1312 for driving the screw rod 1321 to rotate for adjusting the inclined angle of each antenna module 12 relative to the base 11.

Figure 7:
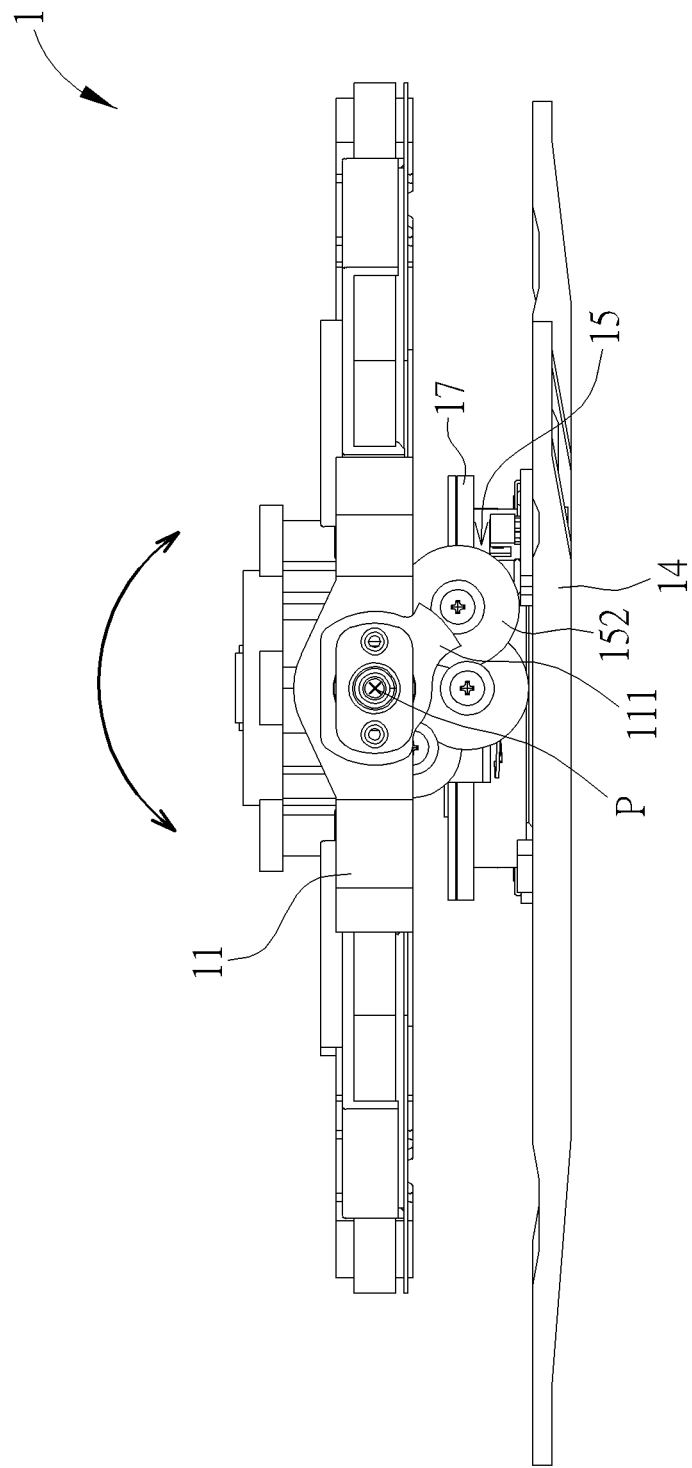
FIG. 7 and FIG. 8 are lateral view diagrams of the adjustable wireless accessible point in different states according to the first embodiment of the present invention.
Figure 8:
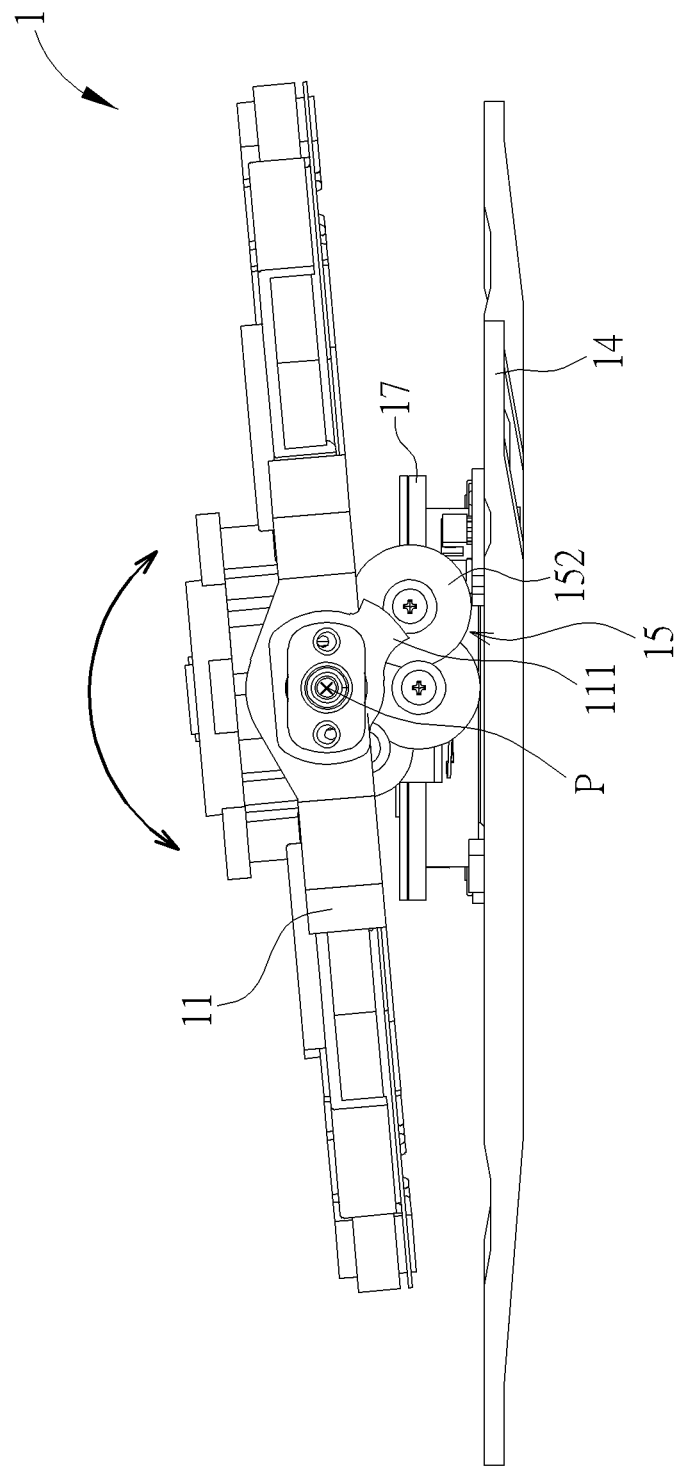

Please refer to FIG. 1 to FIG. 4 and FIG. 7 to FIG. 8. FIG. 7 and FIG. 8 are lateral view diagrams of the adjustable wireless accessible point 1 in different states according to the first embodiment of the present invention. As shown in FIG. 1 to FIG. 4 and FIG. 7 to FIG. 8, the inclining driving module 15 includes a second driving motor 151 and a second transmission assembly 152. The second driving motor 151 is coupled to the base 11 by the second transmission assembly 152 to drive the base 11 to rotate relative to the seat 14 to be inclined relative to the seat 14 for adjusting the inclined angle of the base 11 relative to the seat 14. Specifically, the adjustable wireless accessible point 1 further includes a moving component 17. The base 11 includes a first cooperating component 111 for rotatably cooperating with the second transmission assembly 152. The moving component 17 is installed between the base 11 and the seat 14. The second driving motor 151 and the second transmission assembly 152 are fixed on the moving component 17. An end portion of the first cooperating component 111 can be formed in an arc-shaped structure whose center is located at the inclining rotating axis P, so that the second driving motor 151 can drive the base 11 to rotate around the inclining rotating axis P in the clockwise or counter clockwise direction by the cooperation of the first cooperating component 111 and the second transmission assembly 152 for adjusting the inclined angle of the base 11 relative to the seat 14.

Figure 9:
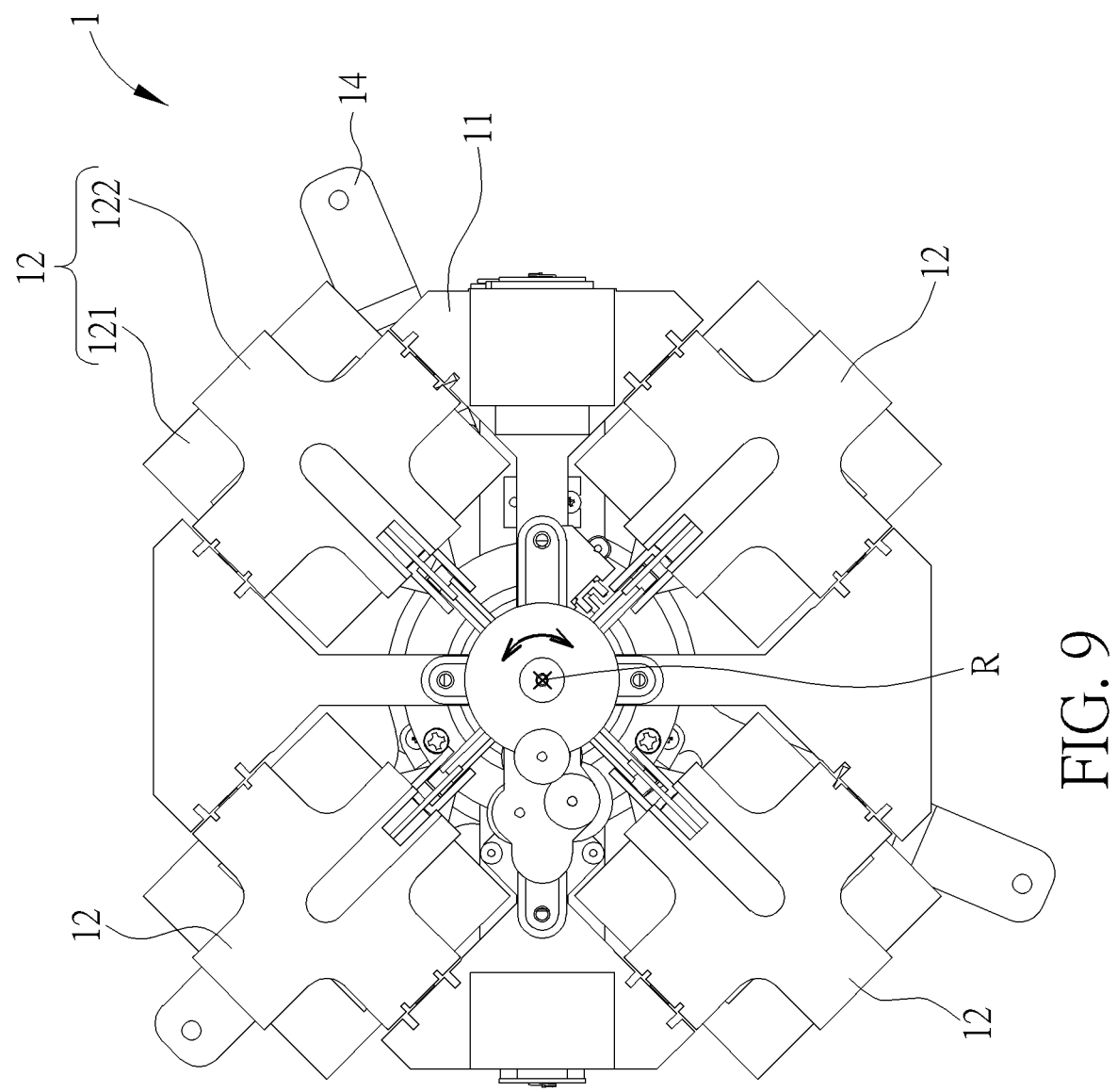
FIG. 9 and FIG. 10 are top view diagrams of the adjustable wireless accessible point in different states according to the first embodiment of the present invention.
Figure 10:
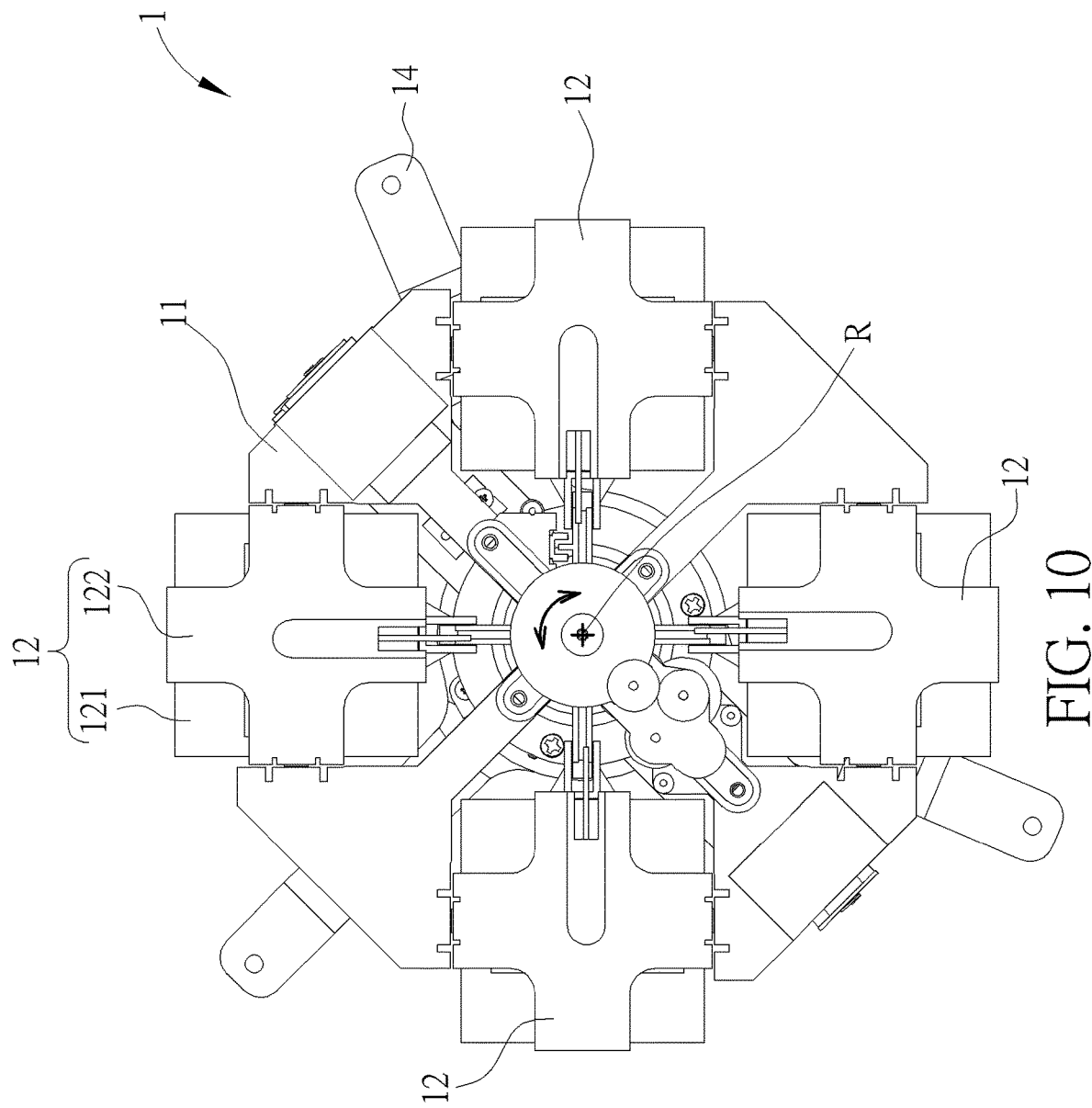

Please refer to FIG. 1 to FIG. 4 and FIG. 9 to FIG. 10. FIG. 9 and FIG. 10 are top view diagrams of the adjustable wireless accessible point 1 in different states according to the first embodiment of the present invention. As shown in FIG. 1 to FIG. 4 and FIG. 9 to FIG. 10, the rotating driving module 16 can include a third driving motor 161 and a third transmission assembly 162. The third driving motor 161 is coupled to the base 11 by the third transmission assembly 162 to drive the base 11 to rotate relative to the seat 14 for adjusting the orientation of the base 11 relative to the seat 14 to adjust orientations of the four antenna modules 12 relative to the seat 14. Specifically, third driving motor 161 and the third transmission assembly 162 are fixed on the moving component 17. The moving component 17 is rotatable relative to the seat 14 around the orientation rotating axis R in a clockwise or counter clockwise direction. The seat 14 includes a second cooperating component 141 for rotatably cooperating with the third transmission assembly 162. The second cooperating component 141 can be formed in an arc-shaped structure whose center is located at the orientation rotating axis R, so that the third driving motor 161 can drive the base 11 to rotate relative to the orientation rotating axis R in the clockwise or counter clockwise direction by the cooperation of the second cooperating component 141 and the third transmission assembly 162 for adjusting the orientation of the base 11 relative to the seat 14.

In this embodiment, preferably, each of the first transmission assembly 1312, the second transmission assembly 152 and the third transmission assembly 162 can be a gear reducer. However, the present invention is not limited to this embodiment. For example, in another embodiment, each of the first transmission assembly, the second transmission assembly or the third transmission assembly also can be a belt reducer. By cooperation of the three driving motors and the three transmission assemblies, the four antenna modules 12 can be driven around three axes and with three degrees of freedom.

Moreover, the adjustable wireless accessible point 1 of the present invention can further include a control unit, which is not shown in the figures, a first sensor S1, a second sensor S2 and a third sensor S3. The control unit is coupled to the first sensor S1, the second sensor S3, the third sensor S3, the first driving motor 1311, the second driving motor 151 and the third driving motor 161. The first sensor S1 is disposed on the base 11 and for detecting the inclined angle of the antenna module 12 relative to the base 11. The second sensor S2 is disposed on the moving component 17 and for detecting the inclined angle of the base 11 relative to the seat 14. The third sensor S3 is disposed on the seat 14 and for detecting the orientation or a rotary angle of the base 11 relative to the seat 14. The control unit can control operations of the first driving motor 1311, the second driving motor 151 and the third driving motor 161 according to detecting results of the first sensor S1, the second sensor S2 and the third sensor S3 respectively, which can restrain the inclined angle of the corresponding antenna module 12 relative to the base 11, the inclined angle of the base 11 relative to the seat 14 or the orientation or the rotary angle of the base 11 relative to the seat 14. Preferably, in this embodiment, the control unit can be a processor, and the first sensor S1, the second sensor S2 and the third sensor S3 can be light sensing components. However, the present invention is not limited to this embodiment.

Figure 11:
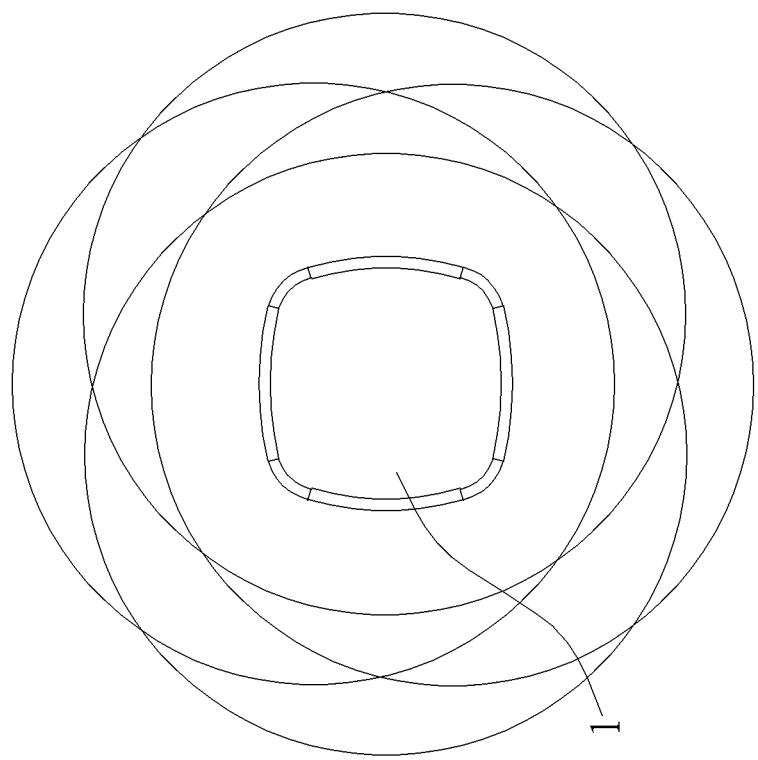
FIG. 11 to FIG. 18 are radiation pattern diagrams of the adjustable wireless accessible point in different states according to the first embodiment.
Figure 12:
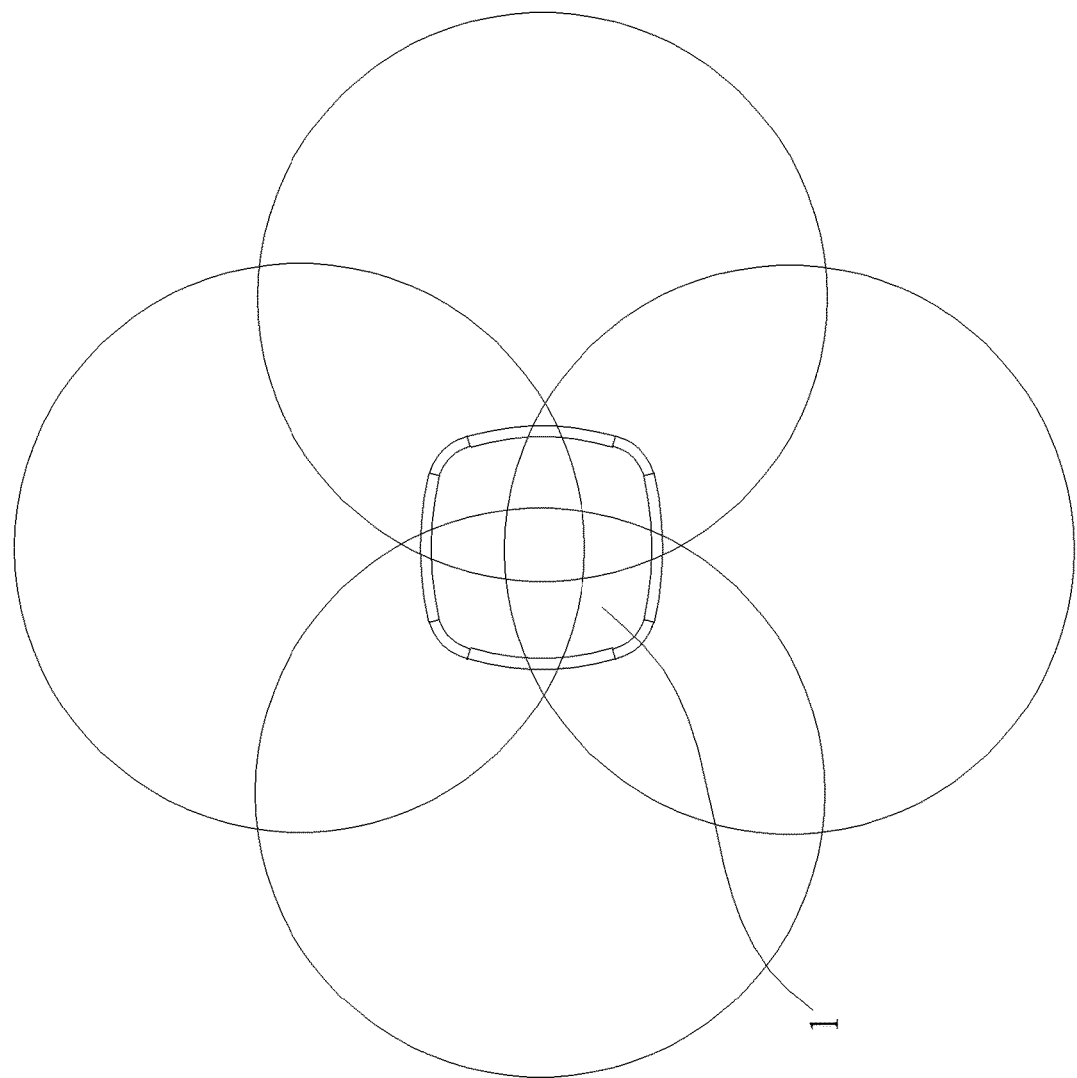
Figure 13:
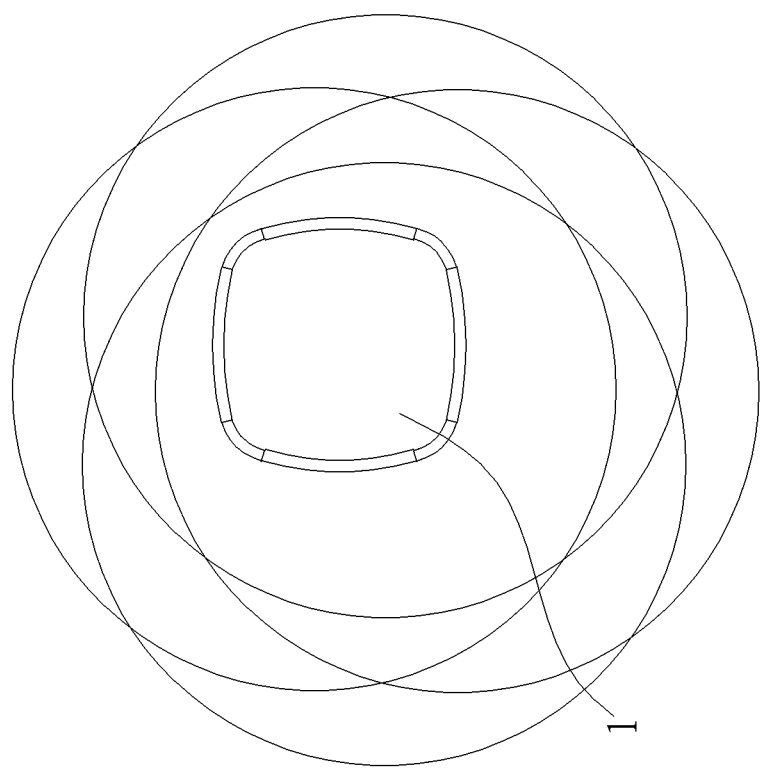

Operational principle of the adjustable wireless accessible point 1 is provided as follows. Please refer to FIG. 11 to FIG. 18. FIG. 11 to FIG. 18 are radiation pattern diagrams of the adjustable wireless accessible point 1 in different states according to the first embodiment. It should be noticed that radiation patterns shown in FIG. 11 to FIG. 18 are merely examples. However, the radiation patterns of the adjustable wireless accessible point 1 are not limited to the ones shown in the figures of this embodiment. Furthermore, the adjustable wireless accessible points 1 shown in FIG. 11 to FIG. 18 are simplified illustration. When it is desired to adjust the radiation pattern from a state as shown in FIG. 11 to a state as shown in FIG. 12, which is more divergent to outwardly extend a covered range of the radiation pattern along four directions (3 o'clock direction, 6 o'clock direction, 9 o'clock direction and 12 o'clock direction), the antenna driving module 13 can be operated to drive the screw rod 1321 to drive the linking component 1322 to move along the longitudinal direction L of the screw rod 1321 to drive the four antenna modules 12 to rotate relative to the base 11 synchronously, so that each antenna module 12 can move from a position as shown in FIG. 5 to a position as shown in FIG. 6 to be inclined relative to the base 11, which accomplishes adjustment of the adjustable wireless accessible point 1.

Figure 14:
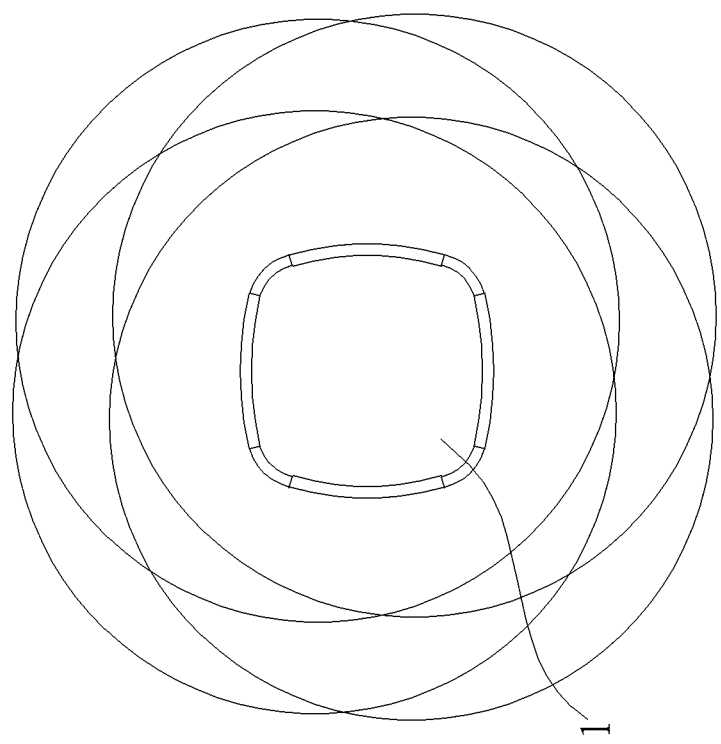

When it is desired to adjust the radiation pattern from the state as shown in FIG. 11 to a state as shown in FIG. 14, which has a another orientation, the rotating driving module 16 can be operated to drive the base 11 to rotate relative to the seat 14 around the orientation rotating axis R, so that the base 11 can move from a position as shown in FIG. 9 to a position as shown in FIG. 10 relative to the seat 14, which accomplishes the adjustment of the adjustable wireless accessible point 1.

Understandably, operation of the adjustable wireless accessible point 1 is not limited to the aforementioned description. The antenna driving module 13, the inclining driving module 15 and the rotating driving module 16 can be operated to cooperate with one another. In other words, a user can selectively operate the antenna driving module 13, the inclining driving module 15 and/or rotating driving module 16 to correspondingly adjust the inclined angle of each antenna module 12 relative to the base 11, the inclined angle of the base 11 relative to the seat 14 and/or the orientation of the base 11 relative to the seat 14 to adjust the radiation pattern to meet various needs of different fields.

Figure 15:
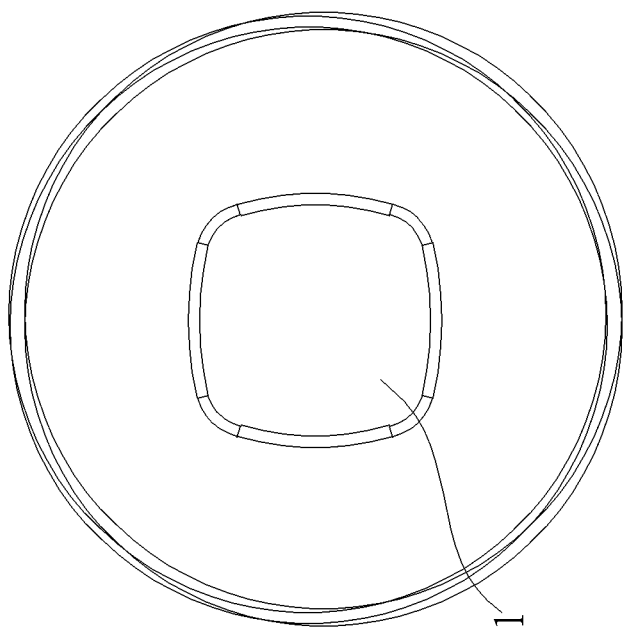
Figure 16:
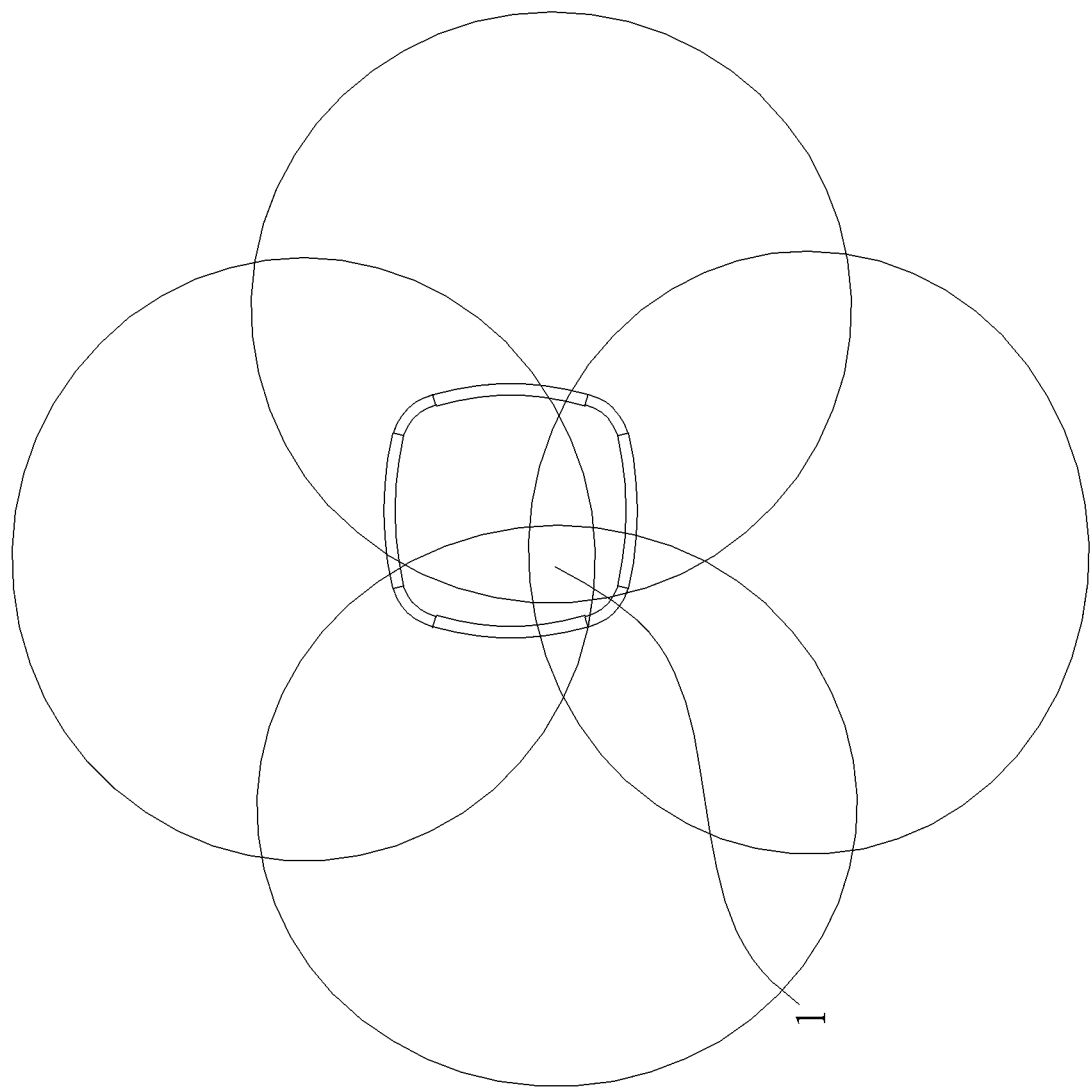
Figure 17:
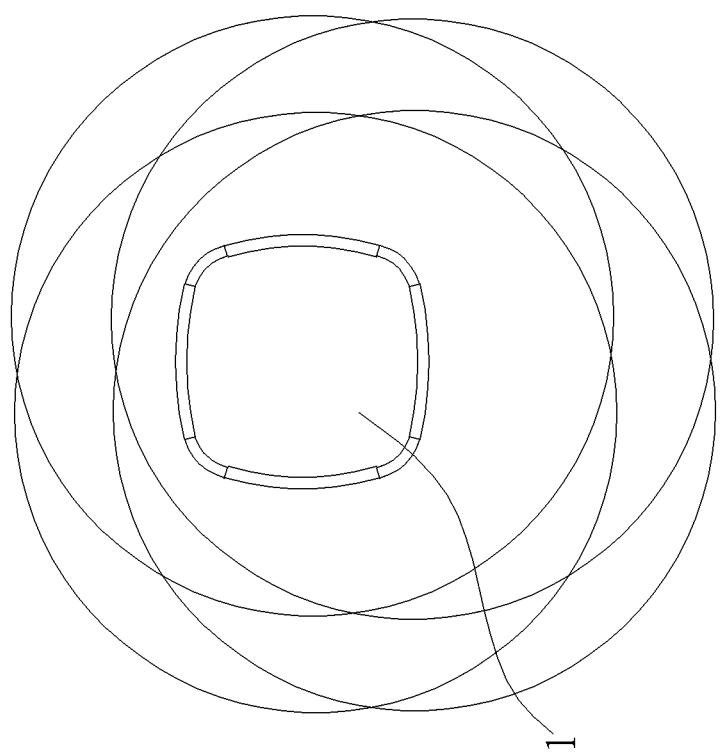
Figure 18:
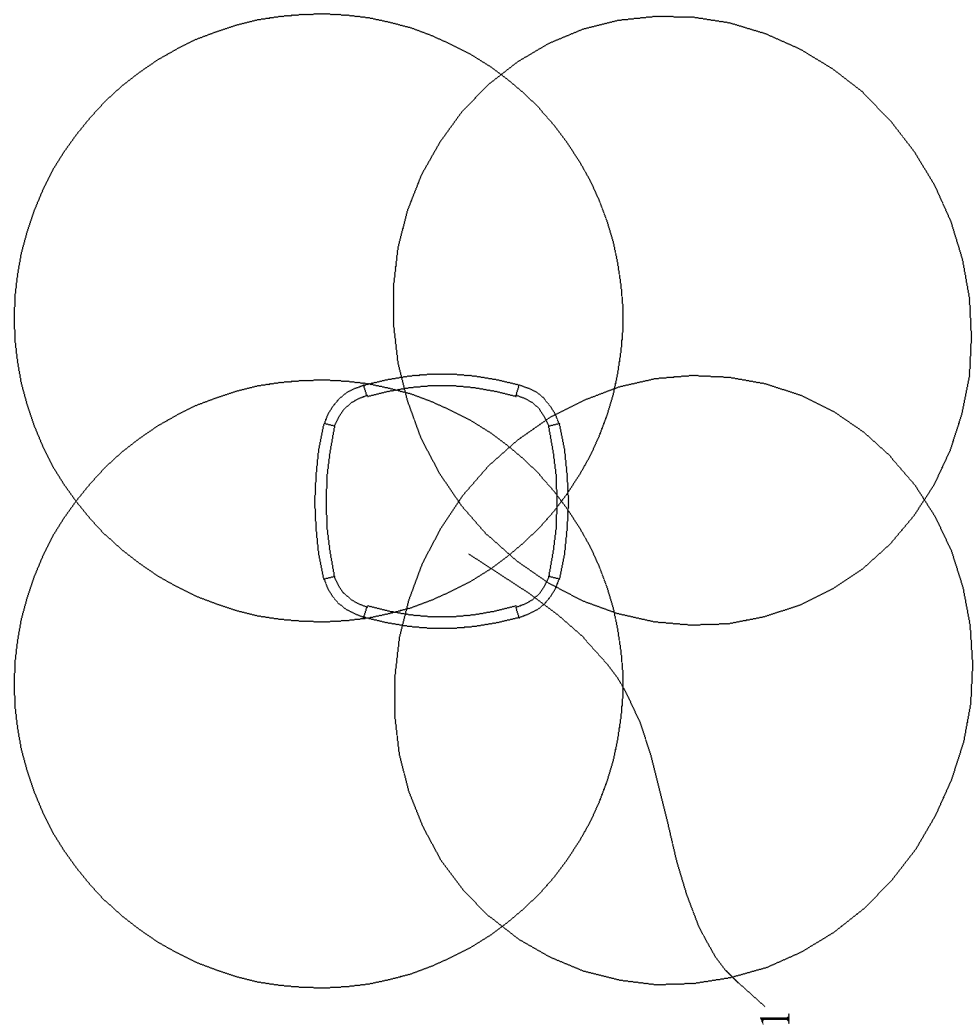

For example, when it is desired to adjust the radiation pattern of the adjustable wireless accessible point 1 from the state as shown in FIG. 11 to a state as shown in FIG. 15, the antenna driving module and the rotating driving module 16 can be operated to correspondingly adjust the inclined angle of each antenna module 12 relative to the base 11 and the orientation of the base 11 relative to the seat 14. When it is desired to adjust the radiation pattern of the adjustable wireless accessible point 1 from the state as shown in FIG. 11 to a state as shown in FIG. 16, the antenna driving module 13 and the inclining driving module 15 can be operated to correspondingly adjust the inclined angle of each antenna module 12 relative to the base 11 and the inclined angle of the base 11 relative to the seat 14. When it is desired to adjust the radiation pattern of the adjustable wireless accessible point 1 from the state as shown in FIG. 11 to a state as shown in FIG. 17, the inclining driving module 15 and the rotating driving module 16 can be operated to correspondingly adjust the inclined angle of the base 11 relative to the seat 14 and the orientation of the base 11 relative to the seat 14. When it is desired to adjust the radiation pattern of the adjustable wireless accessible point 1 from the state as shown in FIG. 11 to a state as shown in FIG. 18, the antenna driving module 13, the inclining driving module 15 and the rotating driving module 16 can be operated to correspondingly adjust the inclined angle of each antenna module 12 relative to the base 11, the inclined angle of the base 11 relative to the seat 14 and the orientation of the base 11 relative to the seat 14.

Figure 19:
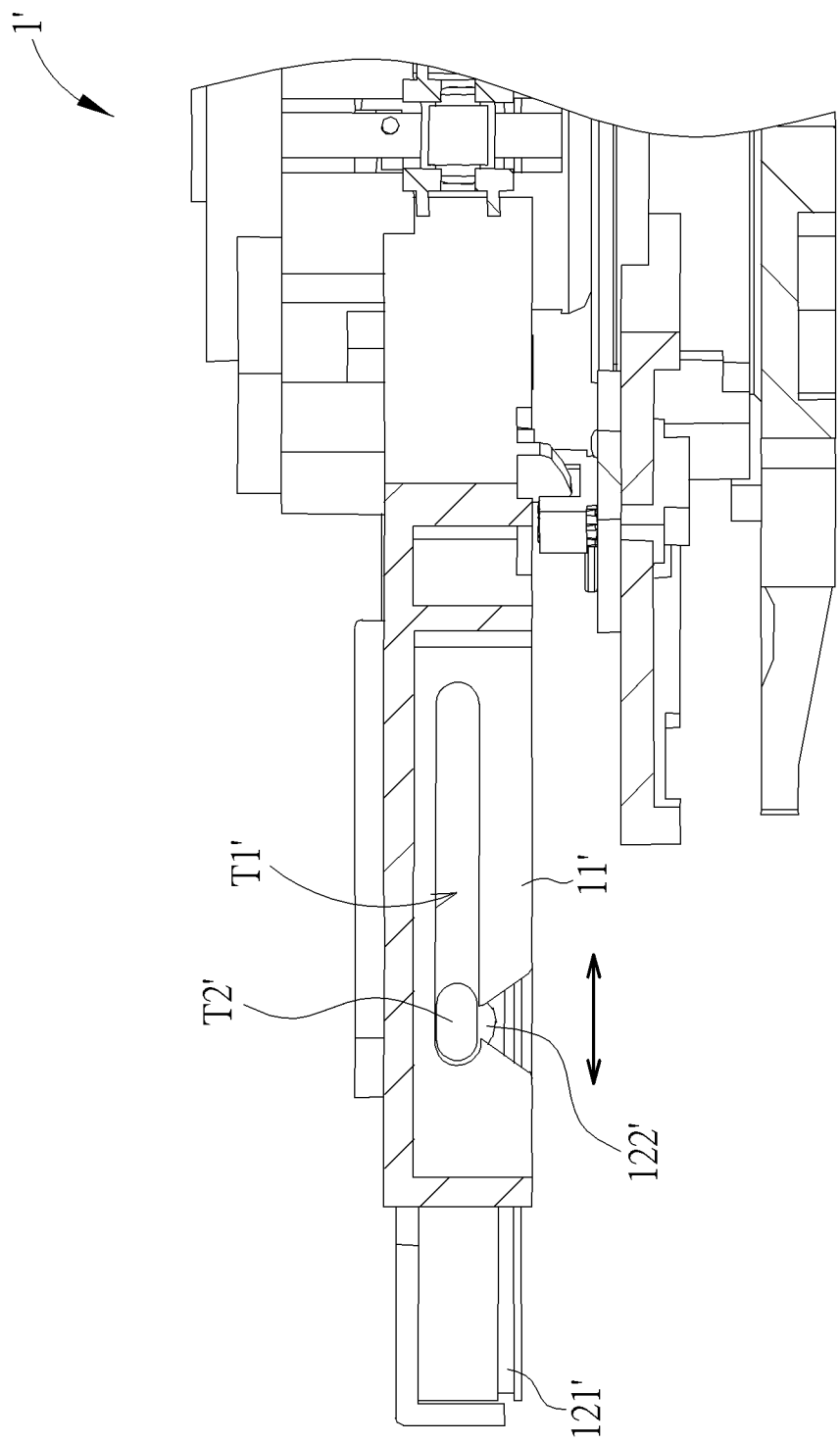
FIG. 19 is a partial sectional diagram of an adjustable wireless accessible point according to a second embodiment of the present invention.
Figure 20:
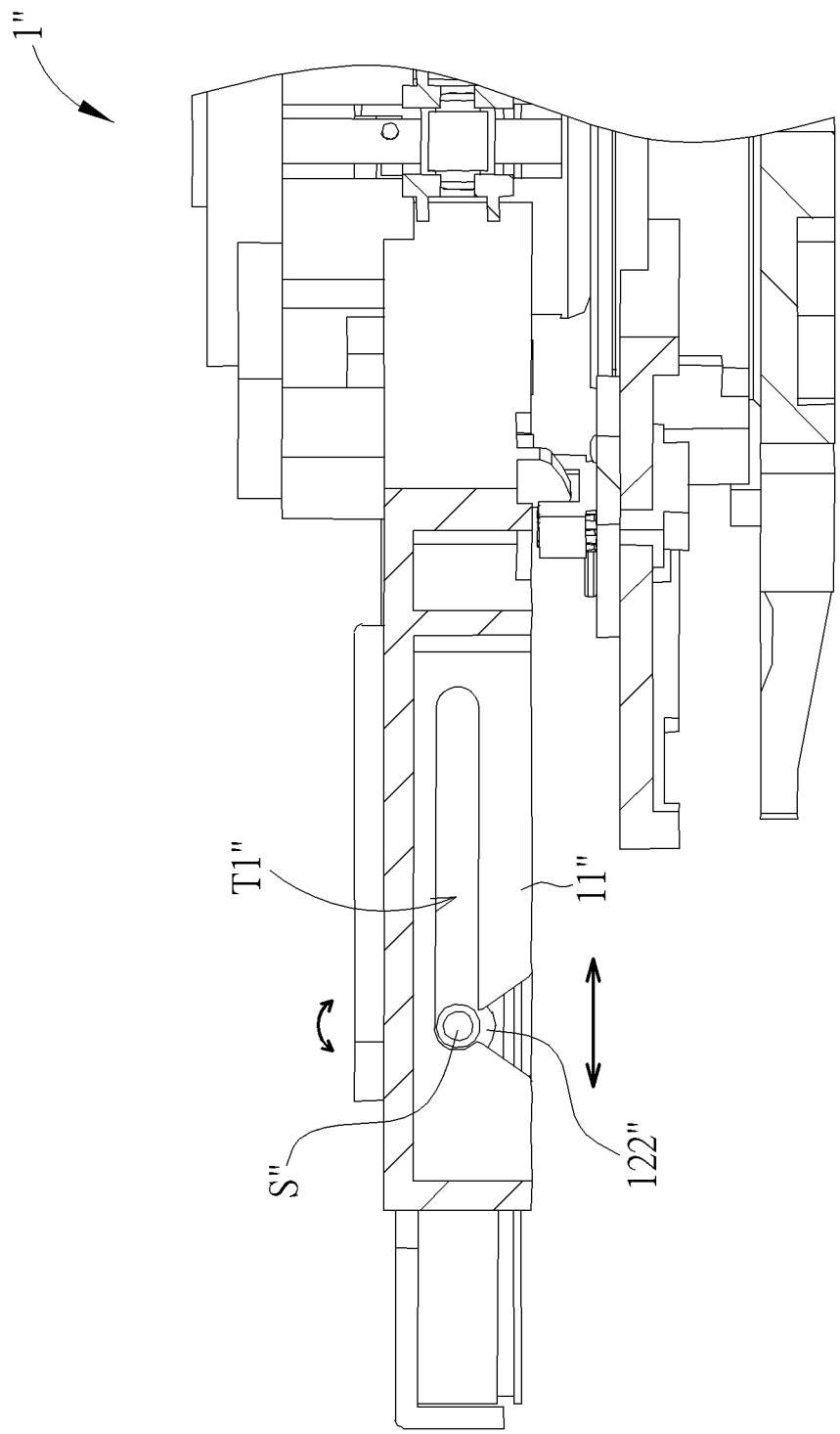
FIG. 20 is a partial sectional diagram of an adjustable wireless accessible point according to a third embodiment of the present invention.

Furthermore, the structure of the adjustable wireless accessible point and the number of the antenna module are not limited to the aforementioned embodiment. For example, please refer to FIG. 19. FIG. 19 is a partial sectional diagram of an adjustable wireless accessible point 1' according to a second embodiment of the present invention. As shown in FIG. 19, in this embodiment, each mounting component 122' can be disposed on a base 11' in a slidable manner for allowing each antenna body 121' to synchronously slide toward a central portion of the base 11' to move close to one another or synchronously slide toward an outer periphery of the base 11' to move away from one another to make a radiation pattern of the adjustable wireless accessible point 1' more concentrated or divergent. Specifically, in order to achieve sliding movement of the mounting component 122' relative to the base 11', a sliding slot structure T1' and a sliding block structure T2' can be respectively formed on the base 11' and the mounting component 122'. Besides, please refer to FIG. 20. FIG. 20 is a partial sectional diagram of an adjustable wireless accessible point 1" according to a third embodiment of the present invention. As shown in FIG. 20, in this embodiment, each mounting component 122" can be disposed on a base 11" in a slidable and rotatable manner for adjusting a radiation pattern of the adjustable wireless accessible point 1". Specifically, in order to achieve sliding movement and rotary movement of the mounting component 122" relative to the base 11", a sliding slot structure T1" and a pivoting shaft structure S" can be respectively formed on the base 11" and the mounting component 122".

Figure 21:
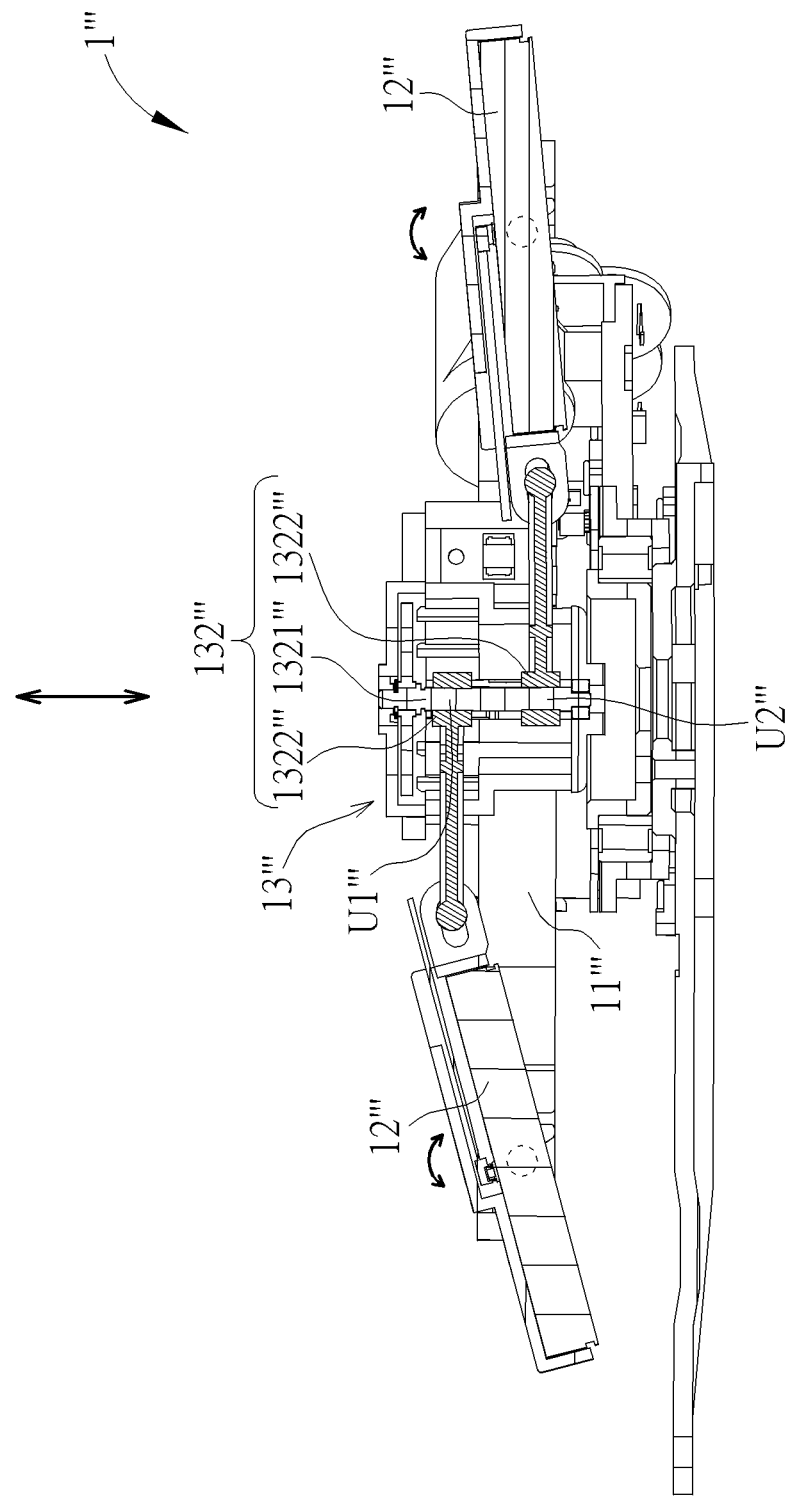
FIG. 21 is a partial sectional diagram of an adjustable wireless accessible point according to a fourth embodiment of the present invention.

In addition, in another embodiment, the seat, the inclining driving module and the rotating driving module can be omitted, and the adjustable wireless accessible point can include a plurality of antenna modules arranged circularly and an antenna driving module disposed between the plurality of antenna modules. Moreover, the linking assembly of the antenna driving module can include a screw rod with a plurality of thread segments and a plurality of linking components respectively disposed on the plurality of thread segments and movably connected to the plurality of antenna modules for controlling movements of the plurality of antenna modules. For example, please refer to FIG. 21. FIG. 21 is a partial sectional diagram of an adjustable wireless accessible point 1''' according to a fourth embodiment of the present invention. As shown in FIG. 21, in this embodiment, the adjustable wireless accessible point 1''' can include two antenna modules 12''' opposite to each other and an antenna driving module 13''' disposed between the two antenna modules 12'''. A linking assembly 132''' of the antenna driving module 13''' can include a screw rod 1321''' with a first thread segment U1''' and a second thread segment U2''' different from the first thread segment U1''', and two linking components 1322''' respectively disposed on the first thread segment U1''' and the second thread segment U2''' and movably connected to the two antenna modules 12''' for driving the two antenna modules 12''' to move relative to a base 11''' asynchronously, so that the two antenna modules 12''' can rotate along different rotating directions or at different rotary angles to be inclined relative to the base 11''' with different inclined angles.

In contrast to the prior art, the present invention utilizes the antenna driving module to drive each antenna module to move synchronously relative to the base to adjust a position of each antenna module relative to the base. Besides, the present invention further utilizes the inclining driving module to drive the base to rotate relative to the seat around the inclining rotating axis to adjust the inclined angle of the base relative to the seat. In addition, the present invention further utilizes the rotating driving module to drive the base to rotate relative to the seat about the orientation rotating axis to adjust the orientation of the base relative to the seat. In such a way, an overall radiation pattern of the adjustable wireless accessible point can be adjusted by adjusting the inclined angle of the base relative to the seat, the orientation of the base relative to the seat, the position of each antenna module relative to the base, or a combination thereof, to satisfy various needs of different fields. Therefore, the adjustable wireless accessible point of the present invention has an enhanced diversity of the radiation pattern and brings convenience in use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An adjustable wireless accessible point comprising:
   a base;
   a plurality of antenna modules movably disposed on the base and for emitting or receiving wireless signals, the plurality of antenna modules being disposed in a opposite or a circular arrangement; and
   an antenna driving module movably connected to the plurality of antenna modules and for driving the plurality of antenna modules to synchronously or asynchronously move relative to the base, the antenna driving module being located between the plurality of antenna modules or within an area enclosed by the plurality of antenna modules, the antenna driving module comprising:
   a driving assembly; and
   a linking assembly movably connected to the driving assembly and the plurality of antenna modules, and the driving assembly driving the plurality of antenna modules to synchronously or asynchronously move relative to the base by the linking assembly, the linking assembly comprising:

a screw rod; and at least one linking component movably disposed on the screw rod and movably connected to the plurality of antenna modules, the driving assembly driving the screw rod to rotate so as to drive the at least one linking component to move along a longitudinal direction of the screw rod to drive the plurality of antenna modules to synchronously or asynchronously move relative to the base.

2. The adjustable wireless accessible point of claim 1, wherein each of the plurality of antenna modules comprises an antenna body and a mounting component, the mounting component is movably disposed on the base, and the antenna body is disposed on the mounting component.

3. The adjustable wireless accessible point of claim 2, wherein the mounting component is movably disposed on the base in a rotatable manner, a slidable manner or a combination thereof, and the antenna body is fixed on or detachably installed on the mounting component.

4. The adjustable wireless accessible point of claim 2, further comprising a seat and an inclining driving module, the base being movably disposed on the seat, and the inclining driving module driving the base to rotate relative to the seat around an inclining rotating axis perpendicular to a normal direction of the seat to adjust an inclined angle of the base relative to the seat.

5. The adjustable wireless accessible point of claim 4, further comprising a rotating driving module, the rotating driving module driving the base to rotate relative to the seat around an orientation rotating axis parallel to the normal direction of the seat to adjust an orientation of the base relative to the seat.

6. The adjustable wireless accessible point of claim 2, further comprising a seat and a rotating driving module, the base being movably disposed on the seat, and the rotating driving module driving the base to rotate relative to the seat around an orientation rotating axis parallel to a normal direction of the seat to adjust an orientation of the base relative to the seat.

7. The adjustable wireless accessible point of claim 1, further comprising a seat and a rotating driving module, the base being movably disposed on the seat, and the rotating driving module driving the base to rotate relative to the seat around an orientation rotating axis parallel to a normal direction of the seat to adjust an orientation of the base relative to the seat.

8. The adjustable wireless accessible point of claim 1, wherein the plurality of antenna modules are rotatably disposed on the base, the screw rod drives the at least one linking component to move along the longitudinal direction of the screw rod to drive the plurality of antenna modules to synchronously or asynchronously rotate relative to the base, so that the plurality of antenna modules are inclined relative to the base.

9. The adjustable wireless accessible point of claim 1, wherein when the screw rod drives the at least one linking component to move along the longitudinal direction of the screw rod, the at least one linking component drives the plurality of antenna modules to synchronously or asynchronously rotate relative to the base, so that the plurality of antenna modules are inclined relative to the base with equal inclined angles or different inclined angles.

10. The adjustable wireless accessible point of claim 1, further comprising a seat and an inclining driving module, the base being movably disposed on the seat, and the inclining driving module driving the base to rotate relative to the seat around an inclining rotating axis perpendicular to a normal direction of the seat to adjust an inclined angle of the base relative to the seat.

11. The adjustable wireless accessible point of claim 10, further comprising a rotating driving module, the rotating driving module driving the base to rotate relative to the seat around an orientation rotating axis parallel to the normal direction of the seat to adjust an orientation of the base relative to the seat.

* * * * *